United States Patent
Luo (12)

(10) Patent No.: US 6,388,030 B2
(45) Date of Patent: May 14, 2002

(54) IRON-BASED CATALYST COMPOSITION AND PROCESS FOR PRODUCING SYNDIOTACTIC 1,2-POLYBUTADIENE

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/850,519

(22) Filed: May 7, 2001

Related U.S. Application Data

(62) Division of application No. 09/172,346, filed on Oct. 14, 1998, now Pat. No. 6,284,702.

(51) Int. Cl.$^7$ .......................... C08F 136/06; C08F 4/70
(52) U.S. Cl. ...................... 526/139; 526/160; 526/171; 526/335; 526/169.1
(58) Field of Search ............................... 326/139, 160, 326/171, 335, 169.1

(56) References Cited

U.S. PATENT DOCUMENTS

| | | | | |
|---|---|---|---|---|
| 3,419,505 A | * | 12/1968 | Marsico | |
| 3,457,186 A | * | 7/1969 | Marsico | |
| 3,457,250 A | | 7/1969 | Gaeth | 260/94.3 |
| 3,498,963 A | | 3/1970 | Ichikawa et al. | 260/94.3 |
| 3,725,373 A | | 4/1973 | Yoo | 260/88.7 |
| 3,778,424 A | | 12/1973 | Suginura et al. | 260/94.3 |
| 3,957,894 A | | 5/1976 | Saeki et al. | 260/666 |
| 4,048,418 A | | 9/1977 | Throckmorton | 526/138 |
| 4,168,357 A | * | 9/1979 | Throckmorton et al. | 526/139 |
| 4,168,374 A | | 9/1979 | Throckmorton et al. | 526/139 |
| 4,182,813 A | | 1/1980 | Makino et al. | 526/92 |
| 4,751,275 A | | 6/1988 | Witte et al. | 526/139 |
| 5,239,023 A | | 8/1993 | Hsu et al. | 526/141 |
| 5,356,997 A | | 10/1994 | Massie, II et al. | 525/237 |
| 5,677,405 A | | 10/1997 | Goodall et al. | 526/281 |
| 5,891,963 A | | 4/1999 | Brookhart et al. | 525/326.1 |
| 5,919,875 A | * | 7/1999 | Luo et al. | 526/139 |
| 6,117,956 A | | 9/2000 | Luo | 526/145 |
| 6,160,063 A | | 12/2000 | Luo | 526/139 |
| 6,180,734 B1 | * | 1/2001 | Luo et al. | 526/139 |
| 6,197,888 B1 | * | 3/2001 | Luo et al. | 525/247 |
| 6,201,080 B1 | | 3/2001 | Luo et al. | 526/139 |
| 6,211,313 B1 | | 4/2001 | Luo | 526/139 |
| 2001/0007000 A1 | | 7/2001 | Luo | 525/247 |

FOREIGN PATENT DOCUMENTS

| | | |
|---|---|---|
| EP | 0 994 128 A1 | 4/2000 |
| WO | 00/75201 A1 | 12/2000 |
| WO | 01/32724 A1 | 5/2001 |

OTHER PUBLICATIONS

English Abstract of Japanese Patent No. 45011154. Apr. 1970.

English Abstract of Japanese Patent No. 48064178. May 1973.

English Abstract of Japanese Patent No. 73006939. Oct. 1973.

Syndiotactic 1,2–Polybutadiene with Co–CS2 Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. 1H and 13C–NMR Study of Highly Syndiotactic 1,2–Polybutadiene and IV Mechanism of Syndiotactic Polymerization of Butadiene with Cobalt Compounds–Organoaluminum–CS2, Journal of Polymer Science: Polymer Chemistry Edition, by H. Ashitaka et al., vol. 21, pp. 1853–1860 and 1951–1995, (1983).

Comprehensive Polymer Science, by Porri and Giarrusso, Pergamon Press, Oxford, vol. 4, pp. 53, (1989) *.

* cited by examiner

*Primary Examiner*—Elizabeth D. Wood
(74) *Attorney, Agent, or Firm*—David G. Burleson; Arthur M. Reginelli

(57) ABSTRACT

A catalyst composition comprising (a) an iron-containing compound, (b) an organomagnesium compound and (c) a dihydrocarbyl hydrogen phosphite is disclosed for polymerizing 1,3-butadiene into syndiotactic 1,2-polybutadiene. The use of the catalyst composition of this disclosure avoids the use of environmentally detrimental components such as carbon disulfide and halogenated solvents. The melting temperature of the syndiotactic 1,2-polybutadiene can be varied from about 100 to about 190° C. by variations in the catalyst components and the component ratios. The ability to vary the melting temperature with a single catalyst composition is very desirable. The syndiotactic 1,2-polybutadiene can be used as a plastic or as an additive for rubber compositions wherein it can crosslink with conventional rubbers using conventional crosslinking agents.

18 Claims, No Drawings

IRON-BASED CATALYST COMPOSITION AND PROCESS FOR PRODUCING SYNDIOTACTIC 1,2-POLYBUTADIENE

This is a divisional of application Ser. No. 09/172,346, filed on Oct. 14, 1998 now U.S. Pat. No. 6,284,702.

FIELD OF INVENTION

The present invention relates to a catalyst composition comprising (a) an iron-containing compound, (b) an organomagnesium compound and (c) a dihydrocarbyl hydrogen phosphite and its use to polymerize 1,3-butadiene into syndiotactic 1,2-polybutadiene. Syndiotactic 1,2-polybutadiene is a thermoplastic resin and is cocurable with conventional rubbers due to its residual unsaturation.

BACKGROUND OF THE INVENTION

Syndiotactic 1,2-polybutadiene is a thermoplastic resin that has a stereoregular structure in which the vinyl groups as side chains are located alternately on the opposite sides in relation to the polymeric main chain consisting of carbon-carbon bonds. Syndiotactic 1,2-polybutadiene is a unique material that combines the properties of plastics and rubber. Accordingly, syndiotactic 1,2-polybutadiene has many uses. For example, films, fibers and molded articles can be made utilizing syndiotactic 1,2-polybutadiene. It can also be blended into rubbers and cocured therewith.

Syndiotactic 1,2-polybutadiene can be made by solution, emulsion or suspension polymerization. The syndiotactic 1,2-polybutadiene from solution, emulsion or suspension polymerization typically has a melting temperature that is within the range of about 195° C. to 215° C. However, for processability reasons it is generally desirable for syndiotactic 1,2-polybutadiene to have a melting temperature of less than about 195° C. to render it suitable for practical utilization.

Various transition metal catalyst systems based on cobalt, titanium, vanadium, chromium, and molybdenum have been reported in the prior art for the preparation of syndiotactic 1,2-polybutadiene (see, e.g., L. Porri and A. Giarrusso, in *Comprehensive Polymer Science*, edited by G. C. Eastmond, A. Ledwith, S. Russo and P. Sigwalt, Pergamon Press: Oxford, 1989, Volume 4, Page 53). However, the majority of these catalyst systems have no practical utility because they have low catalytic activity or poor stereoselectivity and in some cases produce low molecular weight polymers or crosslinked polymers unsuitable for commercial use.

The following two catalyst systems based on cobalt-containing compounds are well known for the preparation of syndiotactic 1,2-polybutadiene on a commercial scale: (1) cobalt bis (acetylacetonate)/triethyl aluminum/water/triphenyl phosphine (U.S. Pat. Nos. 3,498,963 and 4,182,813; Jap. Kokoku 44-32426, assigned to Japan Synthetic Rubber Co. Ltd.), and (2) cobalt tris(acetylacetonate)/triethyl aluminum/carbon disulfide (U.S. Pat. No. 3,778,424; Jap. Kokoku 72-19,892, 81-18,127, 74-17,666, and 74-17,667; Jap. Kokai 81-88,408, 81-88,409, 81-88,410, 75-59,480, 75-121,380, and 75-121,379, assigned to Ube Industries Ltd.). These two catalyst systems also have serious disadvantages.

The cobalt bis(acetylacetonate)/triethyl aluminum/triphenyl phosphine system yields syndiotactic 1,2-polybutadiene having very low crystallinity. In addition, this catalyst system develops sufficient catalytic activity only in halogenated hydrocarbon solvents as the polymerization medium, and halogenated solvents present the problems of toxicity.

The cobalt tris(acetylacetonate)/triethyl aluminum/carbon disulfide system uses carbon disulfide as one of the catalyst components. Because of its high volatility, obnoxious smell, low flash point as well as toxicity, carbon disulfide is difficult and dangerous to use and requires expensive safety measures to prevent even minimal amounts escaping into the atmosphere. Furthermore, the syndiotactic 1,2-polybutadiene produced with this catalyst system has a very high melting temperature within the range of 200–210° C., which makes it difficult to process the polymer. Although the melting temperature of the syndiotactic 1,2-polybutadiene can be reduced by the use of a catalyst modifier as a fourth catalyst component, the presence of such a catalyst modifier also has an adverse effect on the catalyst activity and polymer yields. Accordingly, many restrictions are required for the industrial utilization of the two aforesaid cobalt-based catalyst systems of the prior art.

Coordination catalyst systems based on iron-containing compounds such as iron(III) acetylacetonate/triethylaluminum have been known in the prior art for a long time, but they have very low catalytic activity and poor stereoselectivity for the polymerization of 1,3-butadiene and sometimes give rise to oligomers, low molecular weight liquid polymers, or crosslinked polymers. Therefore, these iron-based catalyst systems of the prior art have no industrial utility.

SUMMARY OF THE INVENTION

It is an object of the present invention to provide syndiotactic 1,2-polybutadiene having various melting temperatures and syndiotacticities without the above-mentioned disadvantages of the prior art.

It is another object of the present invention to provide a process for efficiently producing the aforesaid syndiotactic 1,2-polybutadiene.

It is a further object of the present invention to provide a versatile and inexpensive catalyst composition, which has high catalytic activity and stereoselectivity for use in the production of the aforesaid syndiotactic 1,2-polybutadiene.

Other objects and natures of the present invention will become obvious from the description in the text of the specification hereinafter disclosed.

It has been found that the polymerization of 1,3-butadiene by the use of a specified iron-based catalyst composition is capable of efficiently producing the objective syndiotactic 1,2-polybutadiene.

Specifically, the present invention relates to a catalyst composition which can be utilized in the stereospecific polymerization of 1,3-butadiene monomer into syndiotactic 1,2-polybutadiene, said catalyst composition being a combination of or the reaction product of ingredients comprised of: (a) an iron-containing compound, (b) an organomagnesium compound, and (c) a dihydrocarbyl hydrogen phosphite.

The present invention further relates to a process for the production of syndiotactic 1,2-polybutadiene, which comprises polymerizing 1,3-butadiene monomer in the presence of a catalytically effective amount of the foregoing catalyst composition.

By utilizing the process and catalyst composition of the present invention, numerous distinct and highly beneficial advantages are realized. For example, by utilizing the process and catalyst composition of the present invention, syndiotactic 1,2-polybutadiene can be produced in high yields with low catalyst levels after relatively short polymerization times. Additionally and more significantly, since the catalyst composition of the present invention does not contain the highly volatile, toxic and flammable carbon disulfide which is typically employed in some of the prior-art catalyst systems, the toxicity, obnoxious smell, dangers and expense involved in the use of carbon disulfide are eliminated. Further, the catalyst composition of the present invention displays high catalytic activity in a wide range of solvents including nonhalogenated solvents, such as aliphatic and cycloaliphatic hydrocarbons, which are environmentally preferred. In addition, the catalyst composition of the present invention is iron-based, and iron compounds are generally stable, non-toxic, inexpensive and readily available. Furthermore, the-catalyst composition of the present invention is capable of producing syndiotactic 1,2-polybutadiene having various melting temperatures without the need to use a catalyst modifier as a fourth catalyst component.

DETAILED DESCRIPTION OF THE INVENTION

The catalyst composition of the present invention is a combination of or the reaction product of ingredients comprising: (a) an iron-containing compound, (b) an organomagnesium compound, and (c) a dihydrocarbyl hydrogen phosphite.

As the component (a) of the catalyst composition of the present invention, various iron-containing compounds can be utilized. It is generally advantageous to employ iron-containing compounds that are soluble in a hydrocarbon solvent such as aromatic hydrocarbons, aliphatic hydrocarbons, or cycloaliphatic hydrocarbons. Nevertheless, insoluble iron-containing compounds may merely be suspended in the polymerization medium to form the catalytically active species. Accordingly, no limitations should be placed on the iron-containing compounds to insure solubility.

The iron in the iron-containing compounds employed in the catalyst composition of the present invention can be in various oxidation states including, but not limited to, the 0,+2,+3, and +4 oxidation states. It is preferable to use divalent iron compounds (also called ferrous compounds), wherein the iron is in the +2 oxidation state, and trivalent iron compounds (also called ferric compounds), wherein the iron is in the +3 oxidation state. Suitable types of iron-containing compounds that can be utilized in the catalyst composition of the present invention include, but are not limited to, iron carboxylates, iron β-diketonates, iron alkoxides or aryloxides, iron halides, iron pseudo-halides, and organoiron compounds.

Some specific examples of suitable iron carboxylates include iron(II) formate, iron(III) formate, iron(II) acetate, iron(III) acetate, iron(II) acrylate, iron(III) acrylate, iron(II) methacrylate, iron(III) methacrylate, iron(II) valerate, iron (III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Some specific examples of suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6,6-tetramethyl-3,5-heptanedionate, and iron(III) 2,2,6,6-tetramethyl-3,5-heptanedionate.

Some specific examples of suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

Some specific examples of suitable iron halides include iron(II) fluoride, iron(III) fluoride, iron(II) chloride, iron(III) chloride, iron(II) bromide, iron(III) bromide, and iron (II) iodide.

Some representative examples of suitable iron pseudo-halides include iron(II) cyanide, iron(III) cyanide, iron(II) cyanate, iron(III) cyanate, iron(II) thiocyanate, iron(III) thiocyanate, iron(II) azide, iron(III) azide, and iron(III) ferrocyanide (also called Prussian blue).

As used herein, the term "organoiron compounds" refers to any iron compound containing at least one covalent iron-carbon bond. Some specific examples of suitable organoiron compounds include bis(cyclopentadienyl)iron(II) (also called ferrocene), bis(pentamethylcyclopentadienyl) iron(II) (also called decamethylferrocene), bis(pentadienyl) iron(II), bis(2,4-dimethylpentadienyl)iron(II), bis(allyl) dicarbonyliron(II), (cyclopentadienyl)(pentadienyl)iron(II), tetra(1-norbornyl)iron(IV), (trimethylenemethane) tricarbonyliron(II), bis(butadiene)carbonyliron(0), (butadiene)tricarbonyliron(0), and bis(cyclooctatetraene) iron(0).

The component (b) of the catalyst composition of the present invention is an organomagnesium compound. As used herein, the term "organomagnesium compound" refers to any magnesium compound containing at least one covalent magnesium-carbon bond. It is generally advantageous to employ organomagnesium compounds that are soluble in the hydrocarbon polymerization medium. Two preferred classes of organomagnesium compounds that can be utilized in the catalyst composition of the present invention are dihydrocarbylmagnesium compounds and hydrocarbylmagnesium halides of the Grignard type.

The dihydrocarbylmagnesium compounds are represented by the general formula $MgR_2$, wherein each R, which may be the same or different, is for example, an alkyl, cycloalkyl, aryl, aralkyl, alkaryl or allyl group; each group preferably containing from 1, or the appropriate minimum number of carbon atoms (often 3 or 6) to form such group, up to 20 carbon atoms. Some specific examples of suitable dihydrocarbylmagnesium compounds include diethylmagnesium, di-n-propylmagnesium, diisopropylmagnesium, dibutylmagnesium, dihexylmagnesium, diphenylmagnesium, and dibenzylmagnesium. Dibutylmagnesium is particularly preferred on the grounds of availability and solubility.

The hydrocarbylmagnesium halides of the Grignard type are represented by the general formula RMgX, wherein R is a hydrocarbyl group such as exemplified above and X is fluorine, chlorine, bromine or iodine. Specific examples of suitable hydrocarbylmagnesium halides include methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, and benzylmagnesium chloride.

The catalyst composition of the present invention further comprises the component (c), which is a dihydrocarbyl hydrogen phosphite represented by the following keto-enol tautomeric structures:

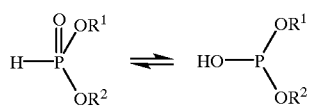

Wherein $R^1$ and $R^2$, which may be the same or different, are hydrocarbyl radicals selected from an alkyl, cycloalkyl, aryl, aralkyl, alkaryl, and allyl group; each group preferably containing from 1, or the appropriate minimum number of carbon atoms (often 3 or 6) to form such group, up to 20 carbon atoms. The dihydrocarbyl hydrogen phosphite exists mainly as the keto tautomer (shown on the left), with the enol tautomer (shown on the right) being the minor species. Either of the two tautomers or mixtures thereof can be used as the component (c) of the catalyst composition of the present invention. The equilibrium constant for the above-mentioned tautomeric equilibrium is dependent upon such factors as the temperature, the types of $R^1$ and $R^2$ groups, the type of solvent, and the like. Both tautomers may be associated in dimeric, trimeric or oligomeric forms by hydrogen bonding.

Some representative examples of suitable dihydrocarbyl hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl) hydrogen phosphite, diisopropyl hydrogen phosphite, bis(3,3-dimethyl-2-butyl) hydrogen phosphite, bis(2,4-dimethyl-3-pentyl) hydrogen phosphite, di-t-butyl hydrogen phosphite, bis(2-ethylhexyl) hydrogen phosphite, dineopentyl hydrogen phosphite, bis(cyclopropylmethyl) hydrogen phosphite, bis(cyclobutylmethyl) hydrogen phosphite, bis(cyclopentylmethyl) hydrogen phosphite, bis(cyclohexylmethyl) hydrogen phosphite, dicyclobutyl hydrogen phosphite, dicyclopentyl hydrogen phosphite, dicyclohexyl hydrogen phosphite, dimenthyl hydrogen phosphite, diphenyl hydrogen phosphite, dinaphthyl hydrogen phosphite, dibenzyl hydrogen phosphite, bis(1-naphthylmethyl) hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

The catalyst composition of the present invention contains the above-described three components (a), (b), and (c) as the main components. In addition to the three catalyst components (a), (b), and (c), other catalyst components such as other organometallic compounds, which are known in the art, can also be added, if desired.

The catalyst composition of the present invention has very high catalytic activity over a wide range of total catalyst concentrations and catalyst component ratios. The three catalyst components (a), (b), and (c) apparently interact to form the active catalyst species. Accordingly, the optimum concentration for any one catalyst component is dependent upon the concentrations of the other two catalyst components. While polymerization will occur over a wide range of catalyst concentrations and catalyst component ratios, the polymers having the most desirable properties are obtained within a narrower range of catalyst concentrations and catalyst component ratios.

The molar ratio of the organomagnesium compound to the iron-containing compound (Mg/Fe) in the catalyst composition of the present invention can be varied from about 1:1 to about 100:1. However, a more preferred range of Mg/Fe molar ratio is from about 2:1 to about 50:1, and a most preferred range is from about 4:1 to about 20:1. The molar ratio of the dihydrocarbyl hydrogen phosphite to the iron-containing compound (P/Fe) can be varied from about 0.5:1 to about 50:1, with a more preferred range being from about 1:1 to about 25:1 and a most preferred range being from about 2:1 to about 10:1.

The total catalyst concentration in the polymerization mass depends on such factors as the purity of the components, the polymerization rate and conversion desired, the polymerization temperature, and the like. Accordingly, specific total catalyst concentrations cannot be definitively set forth except to say that catalytically effective amounts of the respective catalyst components should be used. Generally, the amount of the iron-containing compound used can be varied from about 0.01 to about 2 mmol per 100 g of 1,3-butadiene, with a more preferred range being from about 0.02 to about 1.0 mmol per 100 g of 1,3-butadiene and a most preferred range being from about 0.05 to about 0.5 mmol per 100 g of 1,3-butadiene. Certain specific total catalyst concentrations and catalyst component ratios that produce polymers having desired properties will be illustrated in the examples given to explain the teachings of the present invention.

The three catalyst components of this invention may be introduced into the polymerization system in several different ways. Thus, the catalyst may be formed in situ by adding the three catalyst components to the monomer/solvent mixture in either a stepwise or simultaneous manner; the sequence in which the components are added in a stepwise manner is not critical but the components are preferably added in the sequence of organomagnesium compound, iron-containing compound, and finally dihydrocarbyl hydrogen phosphite. Alternatively, the three catalyst components may also be premixed outside the polymerization system at an appropriate temperature (e.g., from about −20° C. to about 80° C.), and the resulting mixture then added to the polymerization system. Additionally, the catalyst may also be preformed, that is, the three catalyst components are premixed in the presence of a small amount of 1,3-butadiene monomer at an appropriate temperature (e.g., from about −20° C. to about 80° C.), prior to being charged to the main portion of the monomer/solvent mixture that is to be polymerized. The amount of 1,3-butadiene monomer which may be used for the catalyst preforming can range from about 1 to about 500 moles per mole of the iron-containing compound, and preferably should be from about 4 to about 50 moles per mole of the iron-containing compound. In addition, the three catalyst components may also be introduced to the polymerization system using a two-stage procedure. This procedure involves first reacting the iron-containing compound with the organomagnesium compound in the presence of a small amount, as specified above, of 1,3-butadiene monomer at an appropriate temperature (e.g., from about −20° C. to about 80° C.). The resultant reaction mixture and the dihydrocarbyl hydrogen phosphite are then added to the main portion of the monomer/solvent mixture in either a stepwise or simultaneous manner. Further, an alternative two-stage procedure may also be employed. This involves first reacting the iron-containing compound with the dihydrocarbyl hydrogen phosphite at an appropriate temperature (e.g., from about −20° C. to about 80° C.) to form an iron complex, followed by adding the resultant iron complex and the organomagnesium compound to the monomer/solvent mixture in either a stepwise or simultaneous manner.

When a catalyst solution is prepared outside the polymerization system, the organic solvent usable for the catalyst component solution may be selected from aromatic hydrocarbons, aliphatic hydrocarbons and cycloaliphatic hydrocarbons, and mixtures of two or more of the above-mentioned hydrocarbons. Preferably, the organic solvent consists of at least one selected from benzene, toluene, xylene, hexane, heptane and cyclohexane.

As described hereinabove, the iron-based catalyst composition of the present invention containing the three catalyst components (a), (b), and (c) exhibits a very high catalytic activity for the production of syndiotactic 1,2-polybutadiene. Hence, the present invention further provides a process for producing syndiotactic 1,2-polybutadiene by the use of the above-described iron-based catalyst composition.

The production of syndiotactic 1,2-polybutadiene according to the process of the present invention is put into practice by polymerizing 1,3-butadiene monomer in the presence of an iron-based catalyst composition comprising the foregoing three catalyst components (a), (b), and (c). As described above, there are available a variety of methods for bringing the three components of the catalyst composition of the present invention into contact with 1,3-butadiene monomer.

In accordance with the process of the present invention, the polymerization of 1,3-butadiene monomer may be carried out by means of bulk polymerization, wherein no solvents are employed. Such bulk polymerization can be conducted either in a condensed liquid phase or in a gas phase.

Alternatively and more typically, the polymerization of 1,3-butadiene according to the process of the present invention is carried out in an organic solvent as the diluent. In such cases, a solution polymerization system may be employed in which both the 1,3-butadiene monomer to be polymerized and the polymer formed are soluble in the polymerization medium. Alternatively, a suspension polymerization system may be employed by choosing a solvent in which the polymer formed is insoluble. In both cases, an amount of the organic solvent in addition to the organic solvent contained in the catalyst component solutions is usually added to the polymerization system. The additional organic solvent may be either the same as or different from the organic solvent contained in the catalyst component solutions. It is normally desirable to select an organic solvent that is inert with respect to the catalyst composition employed to catalyze the polymerization reaction. Suitable types of organic solvents that can be utilized as the diluent include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of the 1,3-butadiene monomer to be polymerized is not limited to a special range. However, generally, it is preferable that the concentration of the 1,3-butadiene monomer present in the polymerization medium at the beginning of the polymerization be in a range of from about 3% to about 80% by weight, but a more preferred range is from about 5% to about 50% by weight, and the most preferred range is from about 10% to about 30% by weight.

In performing the polymerization of 1,3-butadiene according to the process of the present invention, a molecular weight regulator may be employed to control the molecular weight of the syndiotactic 1,2-polybutadiene to be produced. As a result, the scope of the polymerization system can be expanded in such a manner that it can be used for the production of syndiotactic 1,2-polybutadiene ranging from an extremely high molecular weight polymer to a low molecular weight polymer. Suitable types of molecular weight regulators that can be utilized include, but are not limited to, accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the 1,3-butadiene monomer (phm) employed in the polymerization, is in the range of about 0.01 to about 10 phm, preferably in the range of about 0.02 to about 2 phm, and most preferably in the range of about 0.05 to about 1 phm. In addition, the molecular weight of the syndiotactic 1,2-polybutadiene product to be obtained can also be effectively controlled by conducting the polymerization of the 1,3-butadiene monomer in the presence of hydrogen. In this case, the partial pressure of hydrogen is appropriately chosen within the range of about 0.01 to about 50 atmospheres.

In accordance with the process of the present invention, the polymerization 1,3-butadiene may be carried out as a batch process, on a semi-continuous basis, or on a continuous basis. In any case, the polymerization is desirably conducted under anaerobic conditions using an inert protective gas such as nitrogen, argon or helium, with moderate to vigorous agitation. The polymerization temperature employed in the practice of this invention may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed in the practice of this invention also may vary widely, a preferred pressure range is from about 1 atmosphere to about 10 atmospheres.

The polymerization reaction of the present invention, on reaching a desired conversion, can be stopped by addition of a known polymerization terminator into the polymerization system to inactivate the catalyst system, followed by the conventional steps of desolventization and drying as are typically employed and are known to those skilled in the art in the production of conjugated diene polymers. Typically, the terminator employed to inactivate the catalyst system is a protic compound, which includes, but is not limited to, an alcohol, a carboxylic acid, an inorganic acid, and water or a combination thereof. An antioxidant such as 2,6-di-tert-butyl-4-methylphenol may be added along with, before or after addition of the terminator. The amount of the antioxidant employed is usually in the range of 0.2% to 1% by weight of the polymer product. When the polymerization reaction has been stopped, the syndiotactic 1,2-polybutadiene product may be isolated from the polymerization mixture by precipitation with an alcohol such as methanol, ethanol, or isopropanol or by steam distillation of the solvent and the unreacted 1,3-butadiene monomer, followed by filtration. The product is then generally dried under a constant vacuum at a temperature within the range of about 25° C. to about 100° C. (preferably at about 60° C.).

The syndiotactic 1,2-polybutadiene made utilizing the catalyst composition of the present invention can have various melting temperatures, which are dependent upon the catalyst components and the component ratios. Desirably, the melting temperature varies from about 100 to about 190° C., more desirably from about 110 to about 180° C., and preferably from about 120 to about 170° C. The 1,2-linkage content is desirably from about 70 to about 90%. The syndiotacticity is desirably from about 60 to about 80%.

The syndiotactic 1,2-polybutadiene made utilizing the catalyst composition of the present invention has many uses. It can be blended with various rubbers in order to improve the properties thereof. For example, it can be incorporated into elastomers in order to improve the green strength of those elastomers, particularly in tires. The supporting carcass (reinforcing carcass) of tires is particularly prone to distortion during tire building and curing procedures. For this reason the incorporation of the syndiotactic 1,2-polybutadiene into rubber compositions, which are utilized in the supporting carcass of tires, has particular utility in preventing or minimizing this distortion. In addition, the incorporation of the syndiotactic 1,2-polybutadiene into tire tread compositions can reduce the heat build-up and improve the wear characteristics of tires. The syndiotactic 1,2-polybutadiene product is also useful in the manufacture of food films and in many molding applications.

The practice of the present invention is further illustrated by reference to the following examples which however, should not be construed as limiting the scope of the invention. Parts and percentages shown in the examples are by weight unless otherwise indicated.

EXAMPLE 1

An oven-dried 1-liter glass bottle was capped with a self-sealing rubber liner and a perforated metal cap and purged with a stream of dry nitrogen. The bottle was charged with 66 g of hexanes and 184 g of a 1,3-butadiene/hexanes blend containing 27.2% by weight of 1,3-butadiene. The following catalyst components were added to the bottle in the following order: (1) 0.60 mmol of dibutylmagnesium, (2) 0.10 mmol of iron(III) acetylacetonate, and (3) 0.50 mmol of bis(2-ethylhexyl) hydrogen phosphite. The bottle was tumbled for 5 hours in a water bath maintained at 50° C. The polymerization was terminated by addition of 10 ml of isopropanol containing 0.5 g of 2,6-di-tert-butyl-4-methylphenol. The polymerization mixture was added into 3 liters of isopropanol. The polymer was isolated by filtration and dried to a constant weight under vacuum at 60° C. The yield of the polymer was 48.0 g (96%). As measured by differential scanning calorimetry (DSC), the polymer had a melting temperature of 163° C. $^1$H and $^{13}$C nuclear magnetic resonance (NMR) analysis of the polymer indicated a 1,2-linkage content of 80.3% and a syndiotacticity of 70.6%. As determined by gel permeation chromatography (GPC), the polymer had a weight average molecular weight ($M_w$) of 468,000, a number average molecular weight ($M_n$) of 215,000, and a polydispersity index ($M_w/M_n$) of 2.2. The monomer charge, the amounts of catalyst components and the properties of the resultant syndiotactic 1,2-polybutadiene are summarized in Table I.

EXAMPLES 2–6

In Examples 2–6, the procedure in Example 1 was repeated except that the catalyst ratio was varied as shown in Table I. The monomer charge, the amounts of catalyst components, and the properties of the resultant syndiotactic 1,2-polybutadiene produced in each example are summarized in Table I.

TABLE I

| Example No. | 1 | 2 | 3 | 4 | 5 | 6 |
|---|---|---|---|---|---|---|
| Hexanes | 66 | 66 | 66 | 66 | 66 | 66 |
| 27.2% 1,3-Bd/hexanes (g) | 184 | 184 | 184 | 184 | 184 | 184 |
| MgBu$_2$ (mmol) | 0.60 | 0.40 | 0.50 | 0.70 | 0.80 | 0.50 |
| Fe(acac)$_3$ (mmol) | 0.10 | 0.10 | 0.10 | 0.10 | 0.10 | 0.10 |
| HP(O)(OCH$_2$CH(Et)(CH$_2$)$_3$CH$_3$)$_2$ (mmol) | 0.50 | 0.50 | 0.50 | 0.50 | 0.50 | 0.20 |
| Fe/Mg/P molar ratio | 1:6:5 | 1:4:5 | 1:5:5 | 1:7:5 | 1:8:5 | 1:5:2 |
| Polymer yield (%) after 5 hr at 50° C. | 96 | 92 | 95 | 91 | 76 | 94 |
| Melting point (° C.) | 160 | 162 | 163 | 164 | 162 | 162 |
| $M_w$ | 468,000 | 496,000 | 549,000 | 582,000 | 397,000 | 396,000 |
| $M_n$ | 215,000 | 255,000 | 306,000 | 278,000 | 186,000 | 186,000 |
| $M_w/M_n$ | 2.2 | 2.0 | 1.8 | 2.1 | 2.1 | 2.1 |

EXAMPLES 7–10

In Examples 7–10, the procedure in Example 1 was repeated except that dineopentyl hydrogen phosphite was substituted for bis(2-ethylhexyl) hydrogen phosphite, having the catalyst ratio varied as -o shown in Table II. The monomer charge, the amounts of catalyst components, and the properties of the resultant syndiotactic 1,2-polybutadiene produced in each example are summarized in Table II.

TABLE II

| Example No. | 7 | 8 | 9 | 10 |
|---|---|---|---|---|
| Hexanes | 66 | 66 | 66 | 66 |
| 27.2% 1,3-Bd/hexanes (g) | 184 | 184 | 184 | 184 |
| MgBu$_2$ (mmol) | 0.50 | 0.60 | 0.70 | 0.80 |
| Fe(acac)$_3$ (mmol) | 0.10 | 0.10 | 0.10 | 0.10 |
| HP(O)(OCH$_2$CMe$_3$)$_2$(mmol) | 0.50 | 0.50 | 0.50 | 0.50 |
| Fe/Mg/P molar ratio | 1:5:5 | 1:6:5 | 1:7:5 | 1:8:5 |
| Polymer yield (%) after 5 hr at 50° C. | 93 | 95 | 97 | 95 |
| Melting point (° C.) | 125 | 143 | 167 | 165 |
| M$_w$ | 735,000 | 730,000 | 643,000 | 504,000 |
| M$_n$ | 411,000 | 356,000 | 308,000 | 260,000 |
| M$_w$/M$_n$ | 1.8 | 2.1 | 2.1 | 1.9 |

EXAMPLES 11–14

In Examples 11–14, a series of polymerization experiments were carried out to demonstrate the usefulness of 1,2-butadiene as a molecular weight regulator. The procedure is essentially identical to that described in Example 1 except that various amounts of 1,2-butadiene were added to a polymerization bottle containing the 1,3-butadiene monomer solution before addition of the catalyst components. The monomer charge, the amount of 1,2-butadiene, the amounts of catalyst components, and the properties of the resultant syndiotactic 1,2-polybutadiene produced in each example are summarized in Table III.

TABLE III

| Example No. | 11 | 12 | 13 | 14 |
|---|---|---|---|---|
| Hexanes | 66 | 66 | 66 | 66 |
| 27.2% 1,3-Bd/hexanes (g) | 184 | 184 | 184 | 184 |
| 1,2-Butadiene (phm) | 0 | 0.10 | 0.20 | 0.30 |
| MgBu$_2$ (mmol) | 0.60 | 0.60 | 0.60 | 0.60 |
| Fe(acac)$_3$ (mmol) | 0.10 | 0.10 | 0.10 | 0.10 |
| HP(O)(OCH$_2$CH(Et)(CH$_2$)$_3$CH$_3$)$_2$ (mmol) | 0.50 | 0.50 | 0.50 | 0.50 |
| Fe/Mg/P molar ratio | 1:6:5 | 1:6:5 | 1:6:5 | 1:6:5 |
| Polymer yield (%) after 5 hr at 50° C. | 96 | 92 | 84 | 47 |
| Melting point (° C.) | 163 | 164 | 162 | 159 |
| M$_w$ | 510,000 | 417,000 | 400,000 | 263,000 |
| M$_n$ | 247,000 | 210,000 | 203,000 | 81,000 |
| M$_w$/M$_n$ | 2.1 | 2.0 | 2.0 | 3.2 |

Although the present invention has been described in the above examples with reference to particular means, materials and embodiments, it would be obvious to persons skilled in the art that various changes and modifications may be made, which fall within the scope claimed for the invention as set out in the appended claims. The invention is therefore not limited to the particulars disclosed and extends to all equivalents within the scope of the claims.

What is claimed is:

1. A process for forming syndiotactic 1,2-polybutadiene comprising the step of:
   polymerizing 1,3-butadiene diene monomer in the presence of a catalytically effective amount of a catalyst composition formed by combining:
   (a) an iron-containing compound;
   (b) an organomagnesium compound; and,
   (c) a dihydrocarbyl hydrogen phosphite.

2. The process of claim 1, wherein said iron-containing compound comprises an iron carboxylate, iron β-diketonate, iron alkoxide, iron aryloxide, iron halide, iron pseudo-halide, or organoiron compound or mixtures thereof.

3. The process of claim 1, wherein said iron-containing compound comprises an iron carboxylate, iron β-diketonate, iron alkoxide, or iron aryloxide or mixtures thereof.

4. The process of claim 1, wherein said dihydrocarbyl hydrogen phosphite has the following keto-enol tautomeric structures:

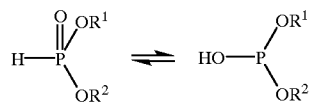

wherein R$^1$ and R$^2$ are independently selected from an alkyl group having 1 to 20 carbons atoms, an allyl or cycloalkyl group having 3 to 20 carbon atoms, or an aryl, aralkyl, or alkaryl group having 6 to 20 carbon atoms.

5. The process of claim 1, wherein said organomagnesium compound has the formula MgR$_2$ or RMgX, where each R individually is an alkyl group having 1 to 20 carbon atoms, an allyl or cycloalkyl group having 3 to 20 carbon atoms or an aryl, aralkyl, or alkaryl group having 6 to 20 carbon atoms and X is fluorine, chlorine, bromine, or iodine.

6. The process of claim 1, wherein said organomagnesium compound has the formula MgR$_2$ or RMgX, where each R individually is an alkyl group having 1 to 20 carbon atoms and X is a fluorine, chlorine, bromine, or iodine.

7. The process of claim 1, wherein the molar ratio of the dihydrocarbyl hydrogen phosphite to the iron-containing compound is from about 0.5:1 to about 50:1 and the molar ratio of the organomagnesium compound to the iron-containing compound is from about 1:1 to about 100:1.

8. The process of claim 1, wherein the molar ratio of the dihydrocarbyl hydrogen phosphite to the iron-containing compound is from about 1:1 to about 25:1.

9. The process of claim 1, wherein the molar ratio of the organomagnesium compound to the iron-containing compound is from about 2:1 to about 50:1.

10. The process of claim 1, wherein the iron-containing compound is present in an amount from about 0.01 to about 2 mmol per 100 g of 1,3- butadiene.

11. The process of claim 1, wherein the polymerization is conducted in the presence of a molecular weight regulator.

12. A process for forming syndiotactic 1,2-polybutadiene comprising the steps of:

polymerizing 1,3-butadiene monomer in the presence of a catalytically effective amount of a catalyst composition formed by combining:

(a) an iron-containing compound;

(b) an organomagnesium compound; and, (c) a dihydrocarbyl hydrogen phosphite, where at least two of the iron-containing compound, organomagnesium compound, and dihydrocarbyl hydrogen phosphite are combined in the presence of conjugated diene monomer.

13. The process of claim 12, where the catalyst composition is formed by first combining the iron-containing compound and the hydrogen phosphite in the presence of 1,3-butadiene monomer to form an initial composition, followed by combining the organomagnesium compound with the initial composition and, optionally, additional 1,3-butadiene monomer.

14. The process of claim 12, where the catalyst composition is formed by first combining the iron-containing compound and the organomagnesium compound in the presence of 1,3-butadiene monomers to form an initial composition, followed by combining the hydrogen phosphite with the initial composition and, optionally, additional 1,3-butadiene monomer.

15. The process of claim 12, where the iron-containing compound and organomagnesium compound are combined outside the presence of monomer to form an initial mixture before combining the initial mixture with the hydrogen phosphite in the presence of 1,3-butadiene monomer.

16. The process of claim 12, where the iron-containing compound and the hydrogen phosphite are combined outside the presence of monomer to form an initial mixture before combining the initial mixture with the organomagnesium compound in the presence of 1,3-butadiene monomer.

17. The process of claim 12, wherein said organomagnesium compound has the formula $MgR_2$ or $RMgX$, where each R individually is an alkyl group having 1 to 20 carbon atoms, an allyl or cycloalkyl group having 3 to 20 carbon atoms or an aryl, aralkyl, or alkaryl group having 6 to 20 carbon atoms and X is fluorine, chlorine, bromine, or iodine.

18. The process of claim 12, wherein said organomagnesium compound has the formula $MgR_2$ or $RMgX$, where each R individually is an alkyl group having 1 to 20 carbon atoms and X is a fluorine, chlorine, bromine, or iodine.

* * * * *